(12) United States Patent
Colcombe

(10) Patent No.: US 6,557,917 B1
(45) Date of Patent: May 6, 2003

(54) PICK-UP TRUCK RACK

(76) Inventor: Brian T. Colcombe, 16 Joan St., Wilbraham, MA (US) 01103

( * ) Notice: Subject to any disclaimer, the term of this patent is extended or adjusted under 35 U.S.C. 154(b) by 0 days.

(21) Appl. No.: 10/086,967

(22) Filed: Mar. 4, 2002

(51) Int. Cl.⁷ .................................................. B60D 3/00
(52) U.S. Cl. ......................................... 296/3; 224/403
(58) Field of Search ................. 296/3, 37.6; 224/403, 224/404; 280/748

(56) References Cited

U.S. PATENT DOCUMENTS

| | | | | |
|---|---|---|---|---|
| 3,589,576 A | * | 6/1971 | Rinkle | |
| 3,765,713 A | | 10/1973 | Suitt | |
| 4,564,216 A | | 1/1986 | Kinyon et al. | |
| 4,565,402 A | | 1/1986 | Hopkins | |
| 4,582,308 A | * | 4/1986 | Yagami et al. | |
| 4,611,824 A | | 9/1986 | McIntosh | |
| 4,770,458 A | * | 9/1988 | Burke et al. | 296/3 |
| 4,867,497 A | | 9/1989 | Jayne | |
| 5,190,337 A | * | 3/1993 | McDaniel | 296/3 |
| D363,460 S | | 10/1995 | Marshall | |
| 5,476,301 A | | 12/1995 | Berkich | |
| 5,480,205 A | * | 1/1996 | Tayer | 296/3 |
| 5,628,540 A | * | 5/1997 | James | 296/3 |
| 5,882,058 A | * | 3/1999 | Karrer | |
| 6,006,971 A | * | 12/1999 | Coleman et al. | 224/404 |

* cited by examiner

*Primary Examiner*—Joseph D. Pape
(74) *Attorney, Agent, or Firm*—McCormick, Paulding & Huber LLP

(57) ABSTRACT

A rack is easily positioned on and fixed to the sidewalls of the open box of a pick-up truck having a truck cab, the rack incorporating a pair of raised supports and interconnected frame members each positioned above the plane of and fixed to the upper free end of one of the truck box side walls, and a shelf spanning the width of the truck box and pivotally connected to the frame members, the shelf being optionally movable between a first or lowered position, wherein it supports a load, while allowing space therebelow in the truck box for the storage of large articles, and a second or raised position, wherein it provides a barrier for protecting the truck cab from damage while allowing full access to the truck box for the transport of tall articles.

3 Claims, 6 Drawing Sheets

PICK-UP TRUCK RACK

BACKGROUND OF THE INVENTION

1. Field of the Invention

The invention relates to carrying racks for vehicles and, more particularly, to such racks for pick-up trucks and the like.

2. Description of Related Art

The prior art reveals a wide variety of carrying racks for vehicles.

However, most are complicated in their structure; are difficult to use or install; and are expensive in their manufacture.

None of the prior art discloses a rack easily secured to the open box of a pick-up truck and incorporating means positioned above and spanning the width of the truck box for optionally supporting a load or providing a barrier for protecting the truck cab while allowing space on the bed of the truck box for transporting large articles.

BRIEF SUMMARY OF THE INVENTION

The rack of the invention is easily positioned on and fixed to the open box of a pick-up truck having a truck cab and incorporates a raised support or step spaced above the truck box, and an integral shelf spanning the width of the truck box and pivotally connected to the support, the shelf being optionally movable between a first or lowered position, wherein it supports a load while allowing space therebelow in the truck box for the storage of large articles, such as a snowmobile or the like, and a second or raised position, wherein it provides a barrier for protecting the truck cab from damage while allowing full access to the truck box for the transport of tall articles, such as a refrigerator or the like.

DETAILED DESCRIPTION OF THE INVENTION

Figure 1:
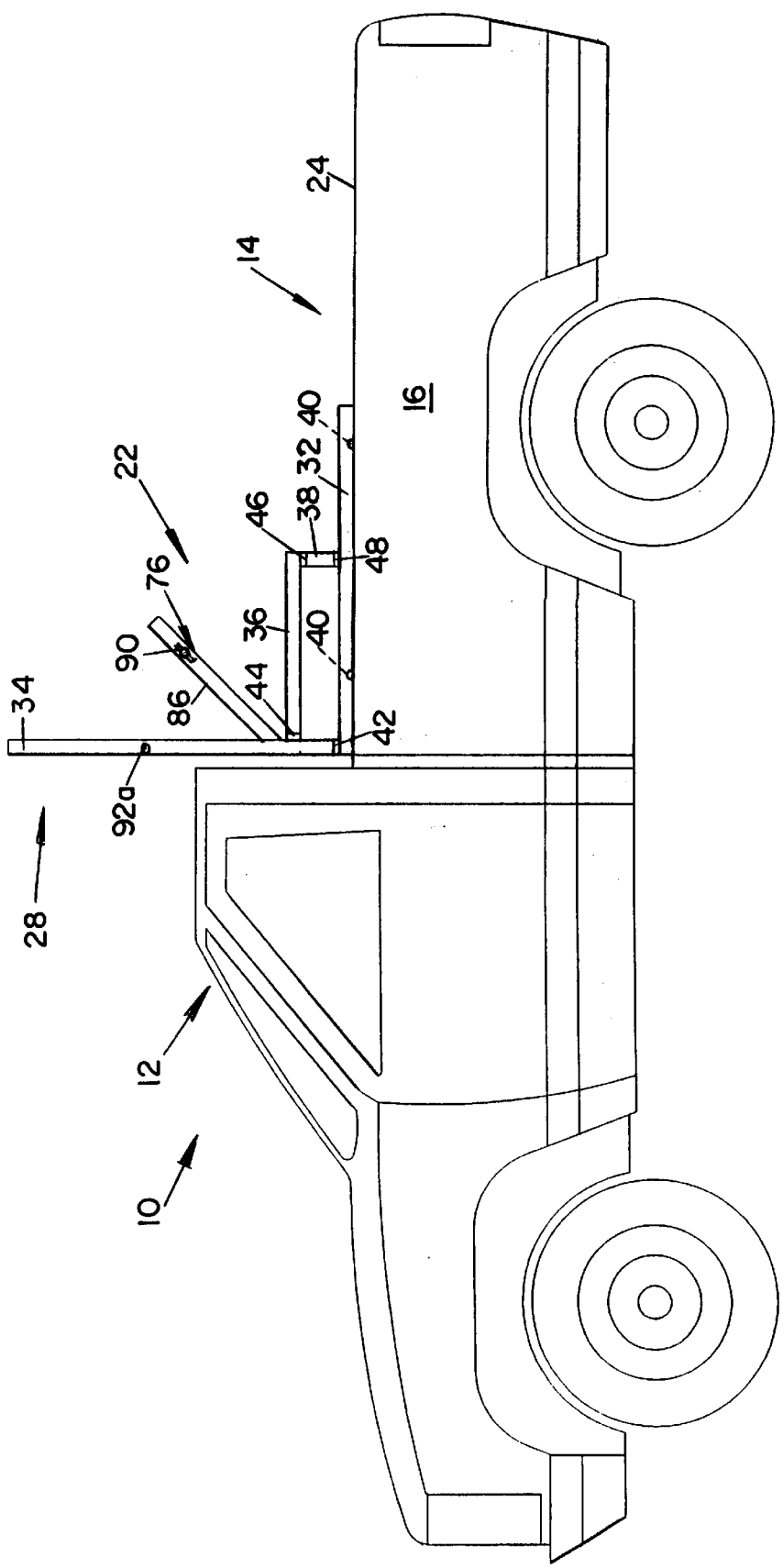
FIG. 1 is a side elevational view of a rack embodying the invention installed on the open box of a pick-up truck, with a combination shelf/cab protector of the rack being shown in an intermediate or partially raised position.
Figure 2:
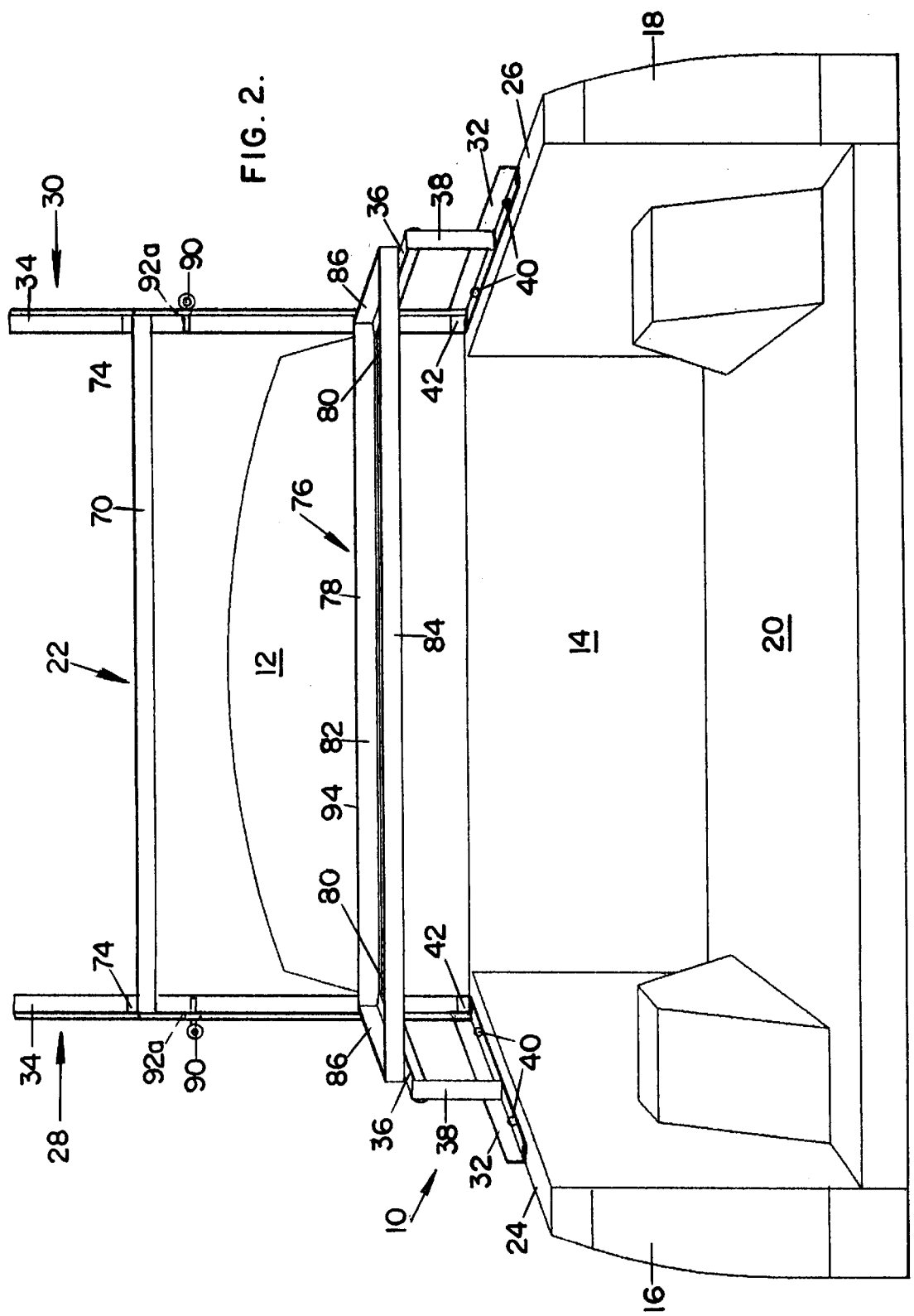
FIG. 2 is a perspective view of a rack embodying the invention installed on the open box of a pick-up truck looking from the rear of the truck box and toward the truck cab, with a combination shelf/cab protector of the rack being shown in a fully lowered or load support position.
Figure 3:
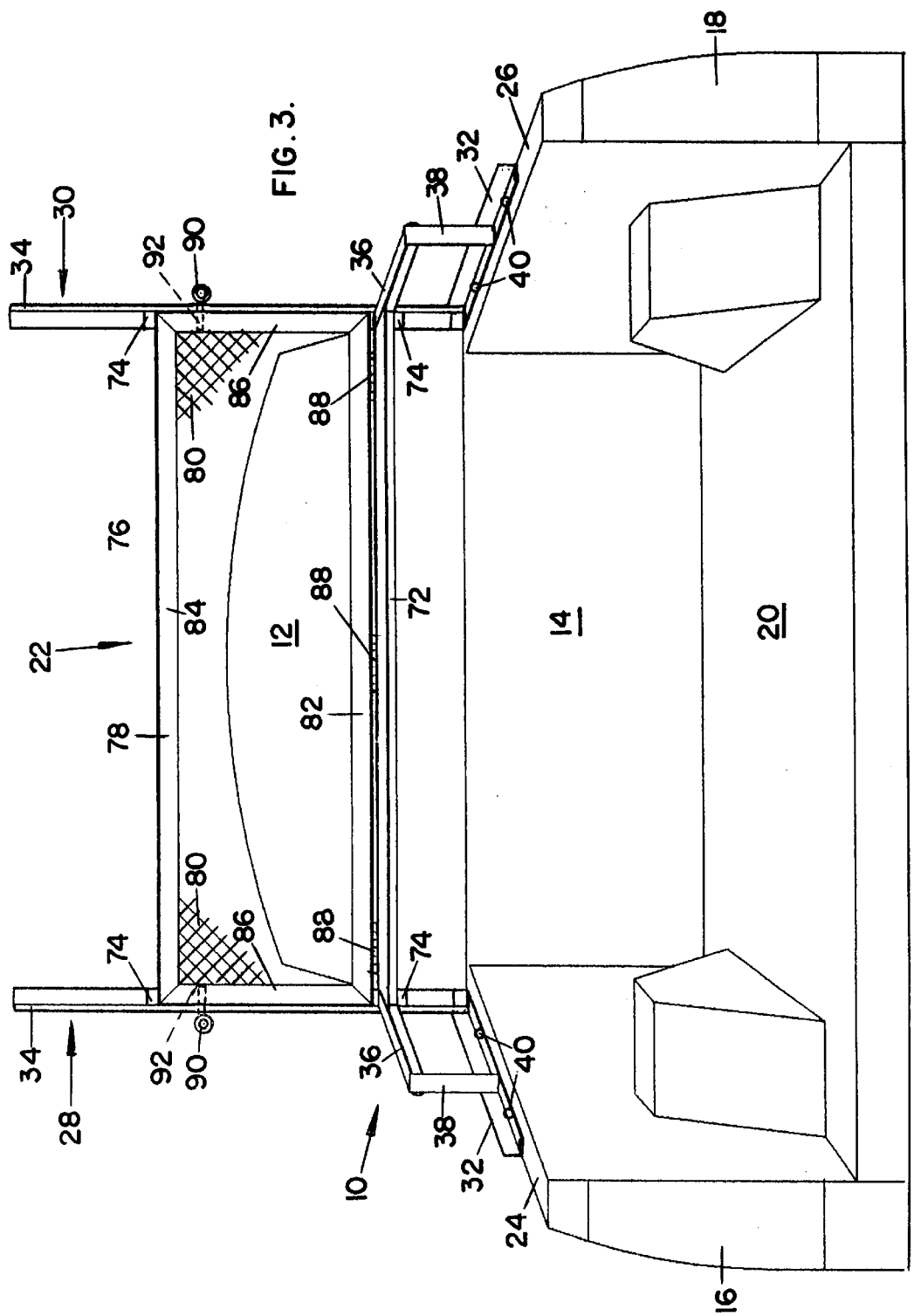
FIG. 3 is a perspective view similar to FIG. 2, with a combination shelf/cab protector of the rack being shown in a fully raised or cab protector position.

Referring to FIGS. 1–3, a pick-up truck of conventional design is generally indicated by 10 and includes a truck cab, generally indicated by 12, adjacent its forward end, and an open truck box, generally indicated by 14, which extends rearwardly from cab 12 and includes a pair of spaced, parallel, upright side walls 16 and 18, which are interconnected at their lower ends by a flat, rectangular bed 20 which extends longitudinally from cab 12 for the length of truck box 14, in usual manner.

A rack embodying the invention is generally indicated by 22 and is attached to truck box side walls 16 and 18 immediately rearwardly of cab 12 so as to span the width of truck box 14.

Rack 20 includes a pair of spaced, parallel, mirror image frames 28 and 30 which are generally L-shaped in side elevation, each of which is comprised of a plurality of angle-irons of usual L-shape in cross section, with the angle-irons of each frame 28 and 30 being interconnected in face-to-face relationship with an adjacent angle-iron.

Frame 28 is fixed to and extends vertically-upwardly from an upper planar surface 24 of truck box side wall 16.

Frame 30 is fixed to and extends vertically-upwardly from an upper planar surface 26 if truck box side wall 18.

Frames 28 and 30 each comprise: a horizontally-disposed base member 32; a vertically-disposed main upright member 34; a horizontally-disposed support member 36 which forms a step which is positioned above and in spaced parallelism to base member 32; and a vertically-disposed secondary upright member 38 positioned in spaced parallism to and rearwardly of main upright member 34.

Herefollowing, while the angle-irons of each frame are described as being interconnected by welds, they can also be interconnected by bolts extending therethrough having nuts threaded thereon.

Base member 32 of each frame 28 and 30 is positioned immediately rearwardly of truck cab 12 and is fixed to an adjacent upper planar face 24 and 26 of truck box side walls 16 and 18 respectively as by bolts 40 which extend downwardly through provided openings 41 in the base member and are threadedly engaged in provided openings, not shown, in the respective truck box side wall.

Main upright member 34 of each frame 28 and 30 is positioned immediately rearwardly of truck cab 12. The upper free end of each main upright member 34 is disposed upwardly of cab 12 and the lower end of each member 34 is engaged with the adjacent forward end of each base member 32.

The lower end of each main upright member 34 of each frame 28 and 30 is secured to each base member 32 as by a weld 42.

Support member 36 of each frame 28 and 30 is positioned above base member 32 and forms a step disposed in spaced parallelism to base member 32.

A forward end of each support member 36 is engaged with and secured to each main upright member 34 upwardly of the lower end of each upright member 34 as by a weld 44.

A rearward end of each support member 36 is engaged with and secured to the upper end of each secondary upright member 38 of each frame 28 and 30 as by a weld 46.

The lower end of each secondary upright member 38 is engaged with and secured to each base member 32 approximately centrally of the length of the latter as by a weld 48.

Support member 36 and secondary upright member 38 of each frame 28 and 30 together form an inverted L-shape in side elevation.

A pair of spaced, parallel, horizontally-disposed upper and lower reinforcing cross bars in the form of angle-irons 70 and 72 respectively, extend between frames 28 and 30, with the ends of each cross bar being fixed to main upright members 34 of each adjacent frame as by welds 74, whereby rack 22 is formed into an integral unit.

Upper reinforcing cross bar 70 is spaced downwardly from the upper free ends of main upright members 34 of frames 28 and 30, for purposes to appear.

Lower reinforcing cross bar 72 is disposed upwardly of the lower ends of main upright members 34 of frames 28 and 30 on a horizontal plane substantially coincident with that of support members 36 of frames 28 and 30, also for purposes to appear.

A combination shelf/cab protector, generally indicated by 76, is pivotally connected to and extends transversely between frames 28 and 30 of rack 22 and includes an open, rectangular, angle-iron framework 78, the opening of which is spanned by a mesh 80 fixed to its lower face, the mesh being fabricated from a strong metal or the like.

Figure 5:
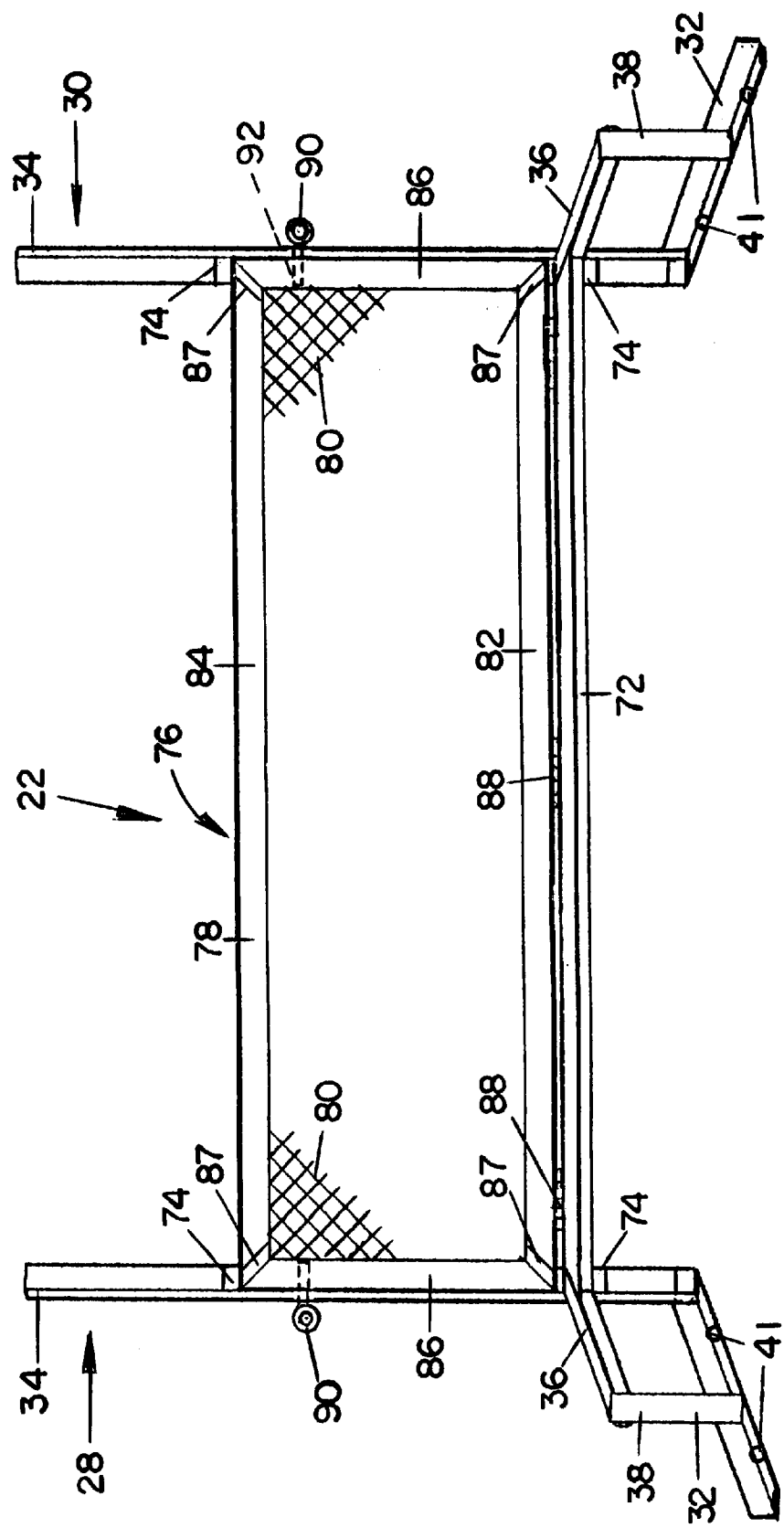
FIG. 5 is a perspective view on an enlarged scale of a rack embodying the invention as seen from the rear, with a combination shelf/cab protector of the rack being shown in a fully raised or cab protector position.

The combination shelf/cab protector framework includes a pair of spaced, parallel transversely-extending, inner and outer cross members, 82 and 84 respectively, which are interconnected at their ends by a pair of spaced, parallel longitudinally-extending end members 86, with the end members being fixed to the cross members as by welds 87; best seen in FIG. 5.

Combination support shelf/cab protector 76 is pivotally connected to lower reinforcing cross bar 72 by a plurality of hinges 88 which extend between and are fixed to cross bar 72 and inner cross member 82 of framework 78.

Figure 4:
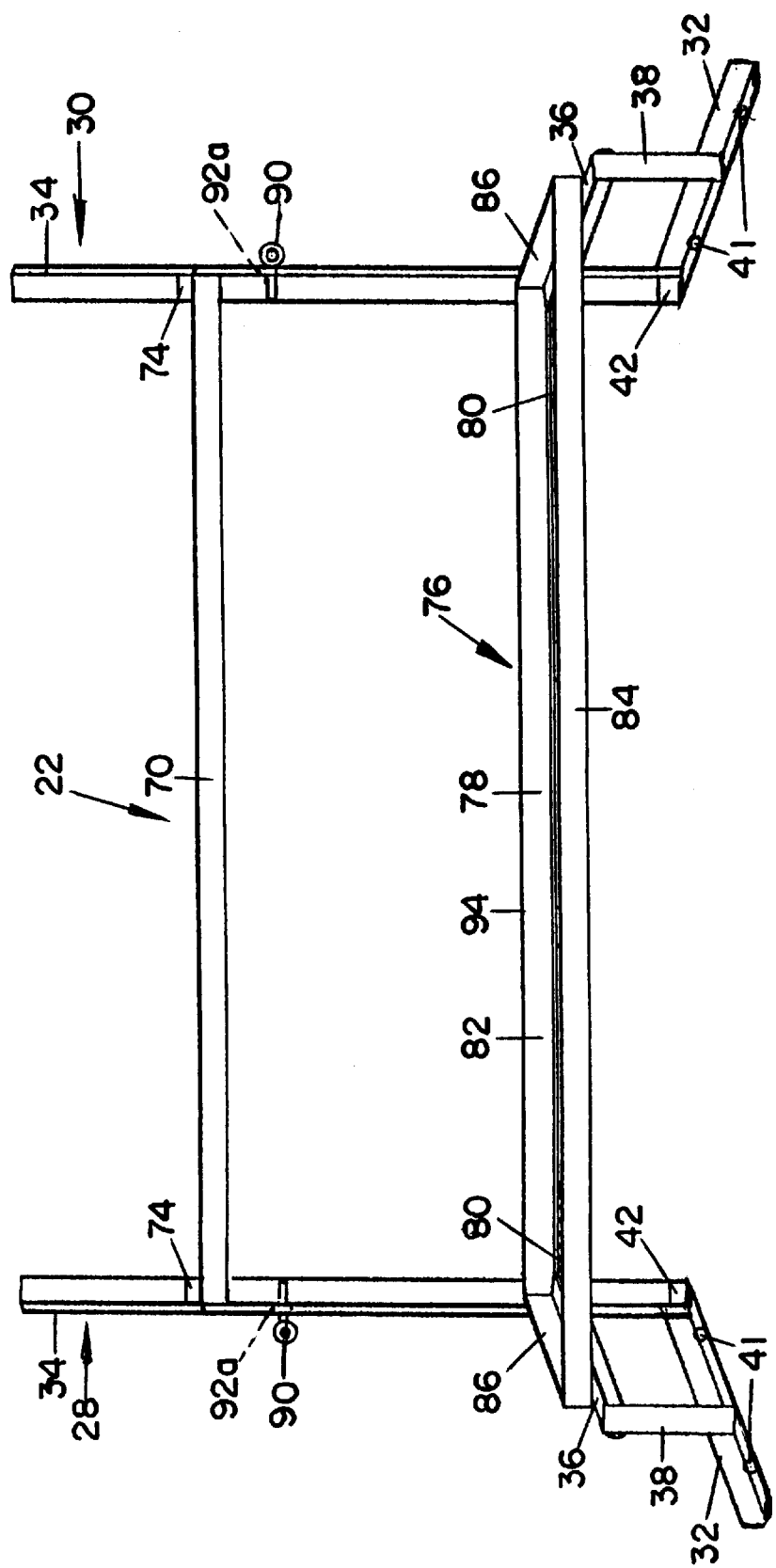
FIG. 4 is a perspective view on an enlarged scale of a rack embodying the invention as seen from the rear, with a combination shelf/cab protector of the rack being shown in a fully lowered or load support position.
Figure 6:
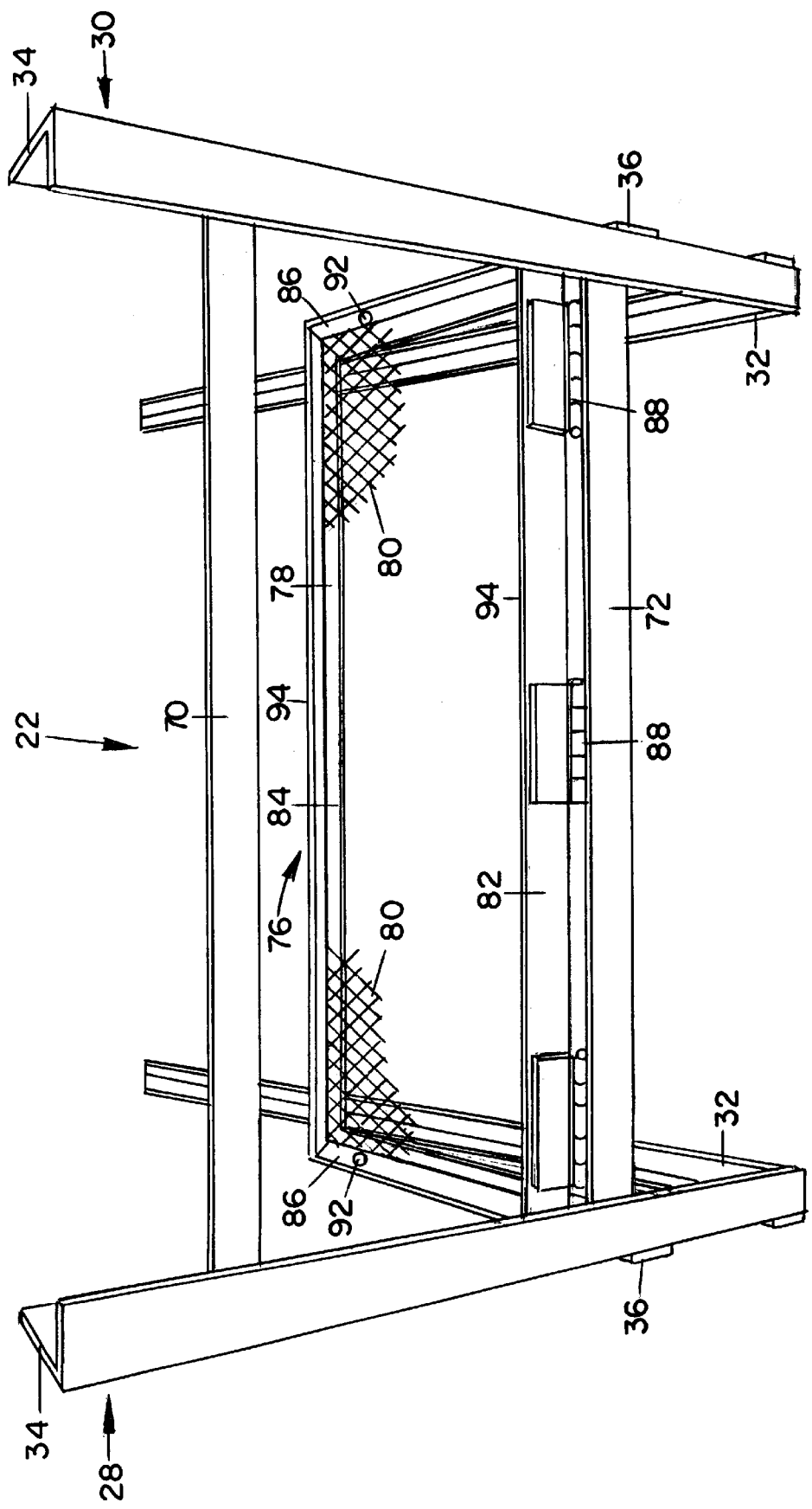
FIG. 6 is a perspective view on an enlarged scale of a rack embodying the invention as seen from the front, with a combination shelf/cab protector thereof being shown in a fully lowered or load support position.

Combination support shelf/cab protector 76 is movable between a first horizontal, or lowered position, as shown in FIGS. 2, 4 and 6, wherein it is resting upon and supported by support members 36 of frames 28 and 30, and a second vertical, or raised position, as shown in FIGS. 3 and 5, wherein it is resting against upper reinforcing cross bar 70 and supported by main upright members 34 of frames 28 and 30, being releasably secured in such raised position by locking pins 90 removably insertable in aligned openings 92 and 92a provided in end members 86 of the framework and main upright members 34 of frames 28 and 30 respectively.

In the first or lowered position of FIGS. 2, 4, and 6, member 76 serves as a rack for various articles, with framework 78 providing shelf 76 with an upstanding peripheral lip 94.

Due to the positioning of support members 36 of frames 28 and 30 above the plane of the upper surfaces of truck box side walls 16 and 18, even with member 76 in a lowered position, space is allowed below member 76 for the accommodation of large articles such as snowmobiles or other large machines or articles on truck bed 20.

In the second or raised position of FIGS. 3 and 5, member 76 serves as a barrier to protect against damage to the truck cab 12 from objects carried in the truck box which may move during transport and crash against the truck cab.

In addition, with member 76 in the second or raised position, truck box 14 is completely open for the transport of elongated or tall items, such as refrigerators or the like.

The rack of the invention is easily installed on the upper ends of the truck box side walls and, while remaining in place, can serve the dual functions of; first, providing a supplemental shelf for carrying articles, while allowing ample space on the bed of the truck box for storage purposes; or second, providing a protective barrier against damage to the truck cab while leaving the entire truck box space open for storage purposes.

I claim:

1. A rack for a pick-up truck having a truck cab and an open box with upstanding side walls having free upper ends, the rack being positioned on and fixed to the free upper ends of the sidewalls of the open box and comprising, a pair of raised supports, an upright member fixed to each support for positioning the support above the plane of the free upper end of one of the truck box sidewalls, each raised support being attached to a frame member which is positioned rearwardly of the truck cab and fixed to each truck box side wall, upper and lower cross braces interconnecting the frame members for forming an integral unit, a shelf spanning the width of the truck box and pivotally connected to the lower cross brace, the shelf being optionally movable between a first or lowered position, wherein it rests on the supports for carrying a load, while allowing space therebelow in the truck box for the storage of large articles, and a second or raised position, wherein it provides a barrier for protecting the truck cab from damage while allowing full access to the truck box for the transport of tall articles, with the upper cross brace forming a stop for the shelf in the second or raised position, and locking means for releasably locking the shelf in the second or raised position.

2. A rack for a pick-up truck according to claim 1, wherein each frame member is of L-shape in side elevation and each support member and upright member is of inverted L-shape in side elevation.

3. A rack for a pick-up truck according to claim 1, wherein the shelf comprises an open framework having a border formed from angle-irons the opening of which is spanned by a mesh bottom wall, with the angle-irons forming an upstanding lip extending around the border of the framework.

* * * * *